(12) United States Patent
Jonasson et al.

(10) Patent No.: US 9,782,933 B2
(45) Date of Patent: Oct. 10, 2017

(54) METHOD AND APPARATUS FOR PRODUCING THREE-DIMENSIONAL OBJECTS

(71) Applicant: Arcam AB, Moelndal (SE)

(72) Inventors: Daniel Jonasson, Goeteborg (SE); Morgan Larsson, Vaestra Froelunda (SE); Ulf Ackelid, Goeteborg (SE); Anders Snis, Uddevalla (SE); Tomas Lock, Goeteborg (SE)

(73) Assignee: Arcam AB, Moelndal (SE)

( * ) Notice: Subject to any disclaimer, the term of this patent is extended or adjusted under 35 U.S.C. 154(b) by 230 days.

(21) Appl. No.: 14/618,748

(22) Filed: Feb. 10, 2015

(65) Prior Publication Data

US 2015/0151490 A1    Jun. 4, 2015

Related U.S. Application Data

(62) Division of application No. 12/810,602, filed as application No. PCT/SE2008/000007 on Jun. 25, 2010, now Pat. No. 8,992,816.

(51) Int. Cl.
*B29C 64/393* (2017.01)
*B29C 67/00* (2017.01)
(Continued)

(52) U.S. Cl.
CPC ........ *B29C 67/0085* (2013.01); *B22F 3/1055* (2013.01); *B29C 64/153* (2017.08);
(Continued)

(58) Field of Classification Search
CPC ............ B29C 67/0085; B29C 67/0088; B29C 67/0077; B22F 3/1055; B22F 2003/1057;
(Continued)

(56) References Cited

U.S. PATENT DOCUMENTS 2,264,968 A   12/1941   De Forest
2,323,715 A    7/1943   Kuehni
(Continued)

FOREIGN PATENT DOCUMENTS

CA      2860188 A1    6/2006
CN    101607311 A   12/2009
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — Matthew Daniels
*Assistant Examiner* — Leith S Shafi
(74) *Attorney, Agent, or Firm* — Alston & Bird LLP

(57) ABSTRACT

The invention concerns an apparatus (1) for producing three-dimensional objects (6) layer by layer using a powdery material which can be solidified by irradiating it with a beam (4) of charged particles, said apparatus (1) comprising means for successive application of powder layers to a work table, and a radiation gun (3) for delivering said beam (4) of charged particles, wherein the inventive apparatus (1) comprises a powder-lifting detection device (10, 10a, 10b, 10c, 10d, 10e) capable of generating a signal (S) upon detection of lifting of powdery material from the working area (5).

19 Claims, 3 Drawing Sheets

Figure 1:
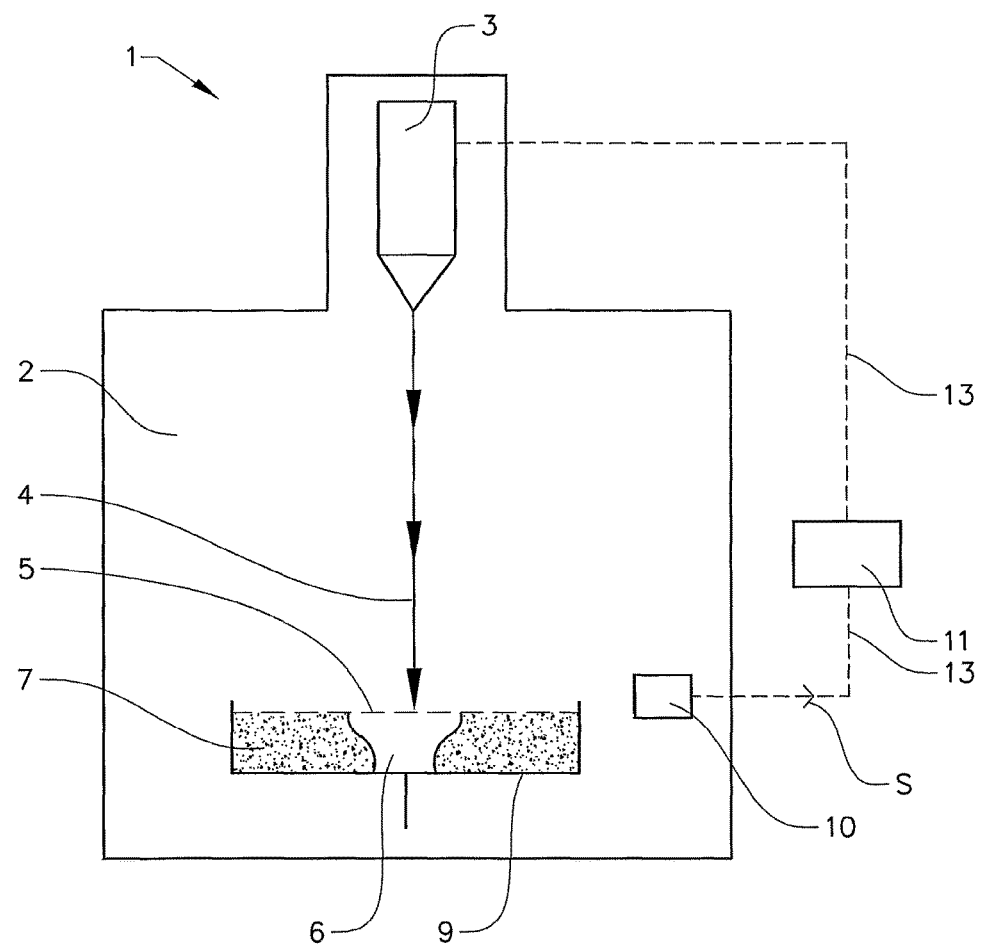

(51) Int. Cl.
  *B22F 3/105* (2006.01)
  *B29C 64/153* (2017.01)
  *B29C 64/20* (2017.01)
  *B29C 64/386* (2017.01)
  *B33Y 30/00* (2015.01)
  *B29L 9/00* (2006.01)

(52) U.S. Cl.
  CPC ............ *B29C 64/20* (2017.08); *B29C 64/386* (2017.08); *B22F 2003/1056* (2013.01); *B22F 2003/1057* (2013.01); *B22F 2999/00* (2013.01); *B29C 64/393* (2017.08); *B29L 2009/00* (2013.01); *B33Y 30/00* (2014.12); *Y02P 10/295* (2015.11)

(58) Field of Classification Search
  CPC .......... B22F 2003/1056; B22F 2999/00; Y02P 10/295; B33Y 30/00; B29L 2009/00
  USPC ..... 425/174, 174.4, 174.6, 174.8 R, 174.8 E; 264/400, 497, 406–412
  See application file for complete search history.

(56) References Cited

U.S. PATENT DOCUMENTS

| | | | |
|---|---|---|---|
| 3,634,644 A | 1/1972 | Ogden et al. | |
| 3,838,496 A | 10/1974 | Kelly | |
| 3,882,477 A | 5/1975 | Mueller | |
| 4,314,134 A | 2/1982 | Schumacher et al. | |
| 4,348,576 A | 9/1982 | Anderl et al. | |
| 4,352,565 A * | 10/1982 | Rowe ................ | G01B 9/02094 356/502 |
| 4,401,719 A | 8/1983 | Kobayashi et al. | |
| 4,541,055 A | 9/1985 | Wolfe et al. | |
| 4,818,562 A | 4/1989 | Arcella et al. | |
| 4,863,538 A | 9/1989 | Deckard | |
| 4,888,490 A * | 12/1989 | Bass ................ | G01S 17/875 250/204 |
| 4,927,992 A | 5/1990 | Whitlow et al. | |
| 4,958,431 A | 9/1990 | Clark et al. | |
| 4,988,844 A | 1/1991 | Dietrich et al. | |
| 5,118,192 A * | 6/1992 | Chen ................ | B23K 31/12 356/602 |
| 5,135,695 A * | 8/1992 | Marcus ................ | B23K 26/04 156/378 |
| 5,167,989 A | 12/1992 | Dudek et al. | |
| 5,182,170 A | 1/1993 | Marcus et al. | |
| 5,204,055 A | 4/1993 | Sachs et al. | |
| 5,247,560 A | 9/1993 | Hosokawa et al. | |
| 5,393,482 A | 2/1995 | Benda et al. | |
| 5,483,036 A | 1/1996 | Giedt et al. | |
| 5,511,103 A | 4/1996 | Hasegawa | |
| 5,595,670 A | 1/1997 | Mombo-Caristan | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,419,203 B1 | 7/2002 | Dang | |
| 6,537,052 B1 | 3/2003 | Adler | |
| 6,554,600 B1 | 4/2003 | Hofmann et al. | |
| 6,583,379 B1 | 6/2003 | Meiners et al. | |
| 6,676,892 B2 | 1/2004 | Das et al. | |
| 6,724,001 B1 | 4/2004 | Pinckney et al. | |
| 6,746,506 B2 | 6/2004 | Liu et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,452,500 B2 | 11/2008 | Uckelmann | |
| 7,537,722 B2 | 5/2009 | Andersson et al. | |
| 7,540,738 B2 | 6/2009 | Larsson et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,754,135 B2 | 7/2010 | Abe et al. | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Escuder et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,310,188 B2 | 4/2016 | Snis | |
| 9,505,172 B2 | 11/2016 | Ljungblad | |
| 9,550,207 B2 | 1/2017 | Ackelid | |
| 2002/0104973 A1 | 8/2002 | Kerekes | |
| 2002/0152002 A1 | 10/2002 | Lindemann et al. | |
| 2002/0195747 A1 * | 12/2002 | Hull ................ | B29C 41/12 264/401 |
| 2003/0043360 A1 * | 3/2003 | Farnworth .......... | B29C 67/0055 355/77 |
| 2003/0133822 A1 | 7/2003 | Harryson | |
| 2003/0205851 A1 | 11/2003 | Laschutza et al. | |
| 2004/0012124 A1 | 1/2004 | Li et al. | |
| 2004/0026807 A1 | 2/2004 | Andersson et al. | |
| 2004/0084814 A1 | 5/2004 | Boyd et al. | |
| 2004/0104499 A1 | 6/2004 | Keller | |
| 2004/0148048 A1 | 7/2004 | Farnworth | |
| 2004/0173496 A1 | 9/2004 | Srinivasan | |
| 2004/0173946 A1 | 9/2004 | Pfeifer et al. | |
| 2004/0204765 A1 | 10/2004 | Fenning et al. | |
| 2004/0217095 A1 | 11/2004 | Herzog | |
| 2005/0173380 A1 | 8/2005 | Carbone | |
| 2005/0186538 A1 * | 8/2005 | Uckelmann ........ | A61C 13/0004 433/201.1 |
| 2006/0108712 A1 | 5/2006 | Mattes | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0074659 A1 * | 4/2007 | Wahlstrom .......... | B29C 67/0066 118/679 |
| 2007/0175875 A1 | 8/2007 | Uckelmann et al. | |
| 2007/0179655 A1 | 8/2007 | Farnworth | |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2009/0206056 A1 | 8/2009 | Xu et al. | |
| 2010/0007062 A1 | 1/2010 | Larsson et al. | |
| 2010/0260410 A1 | 10/2010 | Taminger et al. | |
| 2010/0310404 A1 | 12/2010 | Ackelid | |
| 2010/0316856 A1 | 12/2010 | Currie et al. | |
| 2011/0061591 A1 | 3/2011 | Stecker | |
| 2011/0114839 A1 | 5/2011 | Stecker et al. | |
| 2011/0133367 A1 | 6/2011 | Weidinger et al. | |
| 2011/0240607 A1 | 10/2011 | Stecker et al. | |
| 2011/0241575 A1 | 10/2011 | Caiafa et al. | |
| 2011/0293770 A1 | 12/2011 | Ackelid et al. | |
| 2011/0293771 A1 | 12/2011 | Oberhofer et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0164322 A1 | 6/2012 | Teulet et al. | |
| 2012/0183701 A1 | 7/2012 | Pilz et al. | |
| 2012/0193530 A1 | 8/2012 | Parker et al. | |
| 2012/0211155 A1 | 8/2012 | Wehning et al. | |

(56) References Cited

U.S. PATENT DOCUMENTS

| | | |
|---|---|---|
| 2012/0223059 A1 | 9/2012 | Ljungblad |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0264750 A1 | 10/2013 | Hofacker et al. |
| 2013/0270750 A1 | 10/2013 | Green |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0139849 A1 | 5/2015 | Pialot, Jr. et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |

FOREIGN PATENT DOCUMENTS

| | | | |
|---|---|---|---|
| CN | 101635210 A | 1/2010 | |
| CN | 201693176 U | 1/2011 | |
| CN | 101607311 B | 9/2011 | |
| CN | 203509463 U | 4/2014 | |
| DE | 19952998 A1 | 5/2001 | |
| DE | 20305843 U1 | 7/2003 | |
| DE | 10235434 A1 | 2/2004 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102008012064 A1 | 9/2009 | |
| DE | 102010041284 A1 | 3/2012 | |
| DE | 102011105045 B3 | 6/2012 | |
| DE | 102013210242 A1 | 12/2014 | |
| EP | 0289116 | 2/1988 | |
| EP | 0322257 A2 | 6/1989 | |
| EP | 0688262 A1 | 12/1995 | |
| EP | 1358994 A1 | 11/2003 | |
| EP | 1418013 A1 | 5/2004 | |
| EP | 1466718 A2 | 10/2004 | |
| EP | 1486318 A2 | 12/2004 | |
| EP | 1669143 A1 | 6/2006 | |
| EP | 1683593 A2 | 7/2006 | |
| EP | 1721725 | 11/2006 | |
| EP | 1752240 A1 | 2/2007 | |
| EP | 1952932 A2 | 8/2008 | |
| EP | 2011631 | 1/2009 | |
| EP | 2119530 A1 | 11/2009 | |
| EP | 2281677 A1 | 2/2011 | |
| FR | 2980380 A1 | 3/2013 | |
| JP | 2003241394 A | 8/2003 | |
| JP | 2003245981 | 9/2003 | |
| JP | 2009006509 A | 1/2009 | |
| SE | WO 0181031 A1 * | 11/2001 | ......... B29C 67/0077 |
| SE | 524467 | 8/2004 | |
| WO | WO 93/08928 | 5/1993 | |
| WO | WO 96/12607 A1 | 5/1996 | |
| WO | WO 97/37523 A2 | 10/1997 | |
| WO | WO 01/81031 A1 | 11/2001 | |
| WO | WO 01/85386 | 11/2001 | |
| WO | WO 02/08653 A1 | 1/2002 | |
| WO | WO 2004/007124 A1 | 1/2004 | |
| WO | WO 2004/043680 A2 | 5/2004 | |
| WO | WO 2004/054743 | 7/2004 | |
| WO | WO 2004/056511 | 7/2004 | |
| WO | WO 2004/106041 A2 | 12/2004 | |
| WO | WO 2004/108398 A1 | 12/2004 | |
| WO | WO 2006/091097 A2 | 8/2006 | |
| WO | WO 2006/121374 | 11/2006 | |
| WO | WO 2007/112808 | 10/2007 | |
| WO | WO 2007/147221 A1 | 12/2007 | |
| WO | WO 2008/013483 A1 | 1/2008 | |
| WO | WO 2008/057844 | 5/2008 | |
| WO | WO 2008/074287 A1 | 6/2008 | |
| WO | WO 2008/125497 | 10/2008 | |
| WO | WO 2008/147306 A1 | 12/2008 | |
| WO | WO 2009/072935 A1 | 6/2009 | |
| WO | WO 2009/084991 A1 | 7/2009 | |
| WO | WO 2010/095987 A1 | 8/2010 | |
| WO | WO 2010/125371 A1 | 11/2010 | |
| WO | WO 2011/008143 A1 | 1/2011 | |
| WO | WO 2011/011818 A1 | 2/2011 | |
| WO | WO 2011/030017 A1 | 3/2011 | |
| WO | WO 2011/060312 A2 | 5/2011 | |
| WO | WO 2012/102655 A1 | 8/2012 | |
| WO | WO 2013/098050 A1 | 7/2013 | |
| WO | WO 2013/098135 A1 | 7/2013 | |
| WO | WO 2013/159811 A1 | 10/2013 | |
| WO | WO 2013/167194 A1 | 11/2013 | |
| WO | WO 2013/178825 A2 | 12/2013 | |
| WO | WO 2014/071968 A1 | 5/2014 | |
| WO | WO 2014/092651 A1 | 6/2014 | |
| WO | WO 2014/095200 A1 | 6/2014 | |
| WO | WO 2014/095208 A1 | 6/2014 | |
| WO | WO 2014/195068 A1 | 12/2014 | |
| WO | WO 2015/032590 A2 | 3/2015 | |
| WO | WO 2015/091813 A1 | 6/2015 | |
| WO | WO 2015/142492 A1 | 9/2015 | |

OTHER PUBLICATIONS

European Search Report dated Feb. 16, 2012, for corresponding Application No. EP07 852 089.7.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, dated Dec. 4, 2013, 4 pages European Patent Office, Germany.

(56) References Cited

OTHER PUBLICATIONS

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, dated Apr. 4, 2014, 15 pages, European Patent Office, Germany.
International Preliminary Examining Authority, International Preliminary Report on Patentability for International Application No. PCT/EP2012/074383, including Applicant's Sep. 6, 2013 Reply to ISA's Feb. 27, 2013 Written Opinion, dated Jan. 20, 2014, 16 pages, European Patent Office, The Netherlands.
International Preliminary Report on Patentability dated Nov. 27, 2009 for Application PCT/SE2007/001084.
International Search Report dated Sep. 2, 2008 for Application No. PCT/SE2007/001084.
International Search Report dated Sep. 4, 2010 for Application No. PCT/SE2009/050901.
International Search Report, dated Sep. 17, 2008, of corresponding international Application No. PCT/SE2008/000007, filed Jan. 3, 2008.
International Searching Authority (ISA), International Search Report and Written Opinion for International Application No. PCT/EP2012/076025, dated May 17, 2013, 11 pages, European Patent Office, The Netherlands.
International Searching Authority, International Search Report and Written Opinion for International Application No. PCT/EP2012/074383, dated Feb. 27, 2013, 10 pages, European Patent Office, The Netherlands.
International Searching Authority, International Search Report for International Application No. PCT/SE2011/050093, dated Oct. 20, 2011, 5 pages, The Swedish Patent and Registration Office, Sweden.
International Searching Authority, International Search Report for International Application No. PCT/EP2012/058733, dated Mar. 5, 2013, 4 pages, European Patent Office, The Netherlands.
Office Action dated Feb. 14, 2012 for U.S. Appl. No. 12/745,081.
Office Action dated Nov. 8, 2011, U.S. Appl. No. 12/745,081.
United States Patent and Trademark Office, Final Office Action for U.S. Appl. No. 12/745,081, dated Jun. 21, 2012, 6 pages, USA.
United States Patent and Trademark Office, Notice of Allowance and Fee(s) Due for U.S. Appl. No. 13/144,451, dated Sep. 25, 2012, 16 pages, USA.
United States Patent and Trademark Office, Office Action for U.S. Appl. No. 14/350,767, dated Nov. 24, 2014, 16 pages, USA.
United States Patent and Trademark Office, Office Action for U.S. Appl. No. 12/810,602, Sep. 11, 2014, 7 pages, USA.
United States Patent and Trademark Office, Office Action for U.S. Appl. No. 12/810,602, dated Sep. 10, 2012, 13 pages, USA.
United States Patent and Trademark Office, Office Action for U.S. Appl. No. 12/810,602, dated Dec. 20, 2012, 8 pages, USA.
United States Patent and Trademark Office, Notice of Allowance for U.S. Appl. No. 12/810,602, dated Feb. 2, 2015, 10 pages, USA.
Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
Gibson, D.W., et al., "Additive Manufacturing Technologies: Rapid Prototyping to Direct Digital Manufacturing", 2010, pp. 126-129, Spring, New York.

* cited by examiner

METHOD AND APPARATUS FOR PRODUCING THREE-DIMENSIONAL OBJECTS

CROSS-REFERENCE TO RELATED APPLICATIONS

This application is a divisional of U.S. Nonprovisional application Ser. No. 12/810,602, filed Jun. 25, 2010, which is a national stage application, filed under 35 U.S.C. §371, of International Application No. PCT/SE2008/000007, filed Jan. 3, 2008, the contents of both of which as are hereby incorporated by reference in their entirety.

BACKGROUND

Field of the Invention

This invention relates to a method and apparatus for producing three-dimensional objects layer by layer using a powdery material which can be solidified by irradiating it with a beam of charged particles.

Description of Related Art

Equipment for producing a three-dimensional object layer by layer using a powdery material which can be solidified by irradiating it with electromagnetic radiation or an electron beam are known from e.g. U.S. Pat. No. 4,863,538, U.S. Pat. No. 5,647,931 and WO 2004/056511. Such equipment include for instance a supply of powder, means for applying a layer of powder on a work table, and means for directing the beam over the work table. The powder sinters or melts and solidifies as the beam moves or sweeps over a working area of the work table.

When melting or sintering a powder using a high-energy beam, it is important to avoid exceeding the vaporization temperature of the powder, since otherwise the powder will vaporize instead of forming the intended product. US 2005/0186538 discloses a method focusing on this problem. In this method a laser beam repeatedly is directed to the same powder target area during the melting/sintering phase as to step-wise raise the powder temperature. This way, a too high powder temperature is avoided.

When using an electron beam, or other charged particle beam, instead of a laser beam the situation is in some ways different. As the beam of charged particles interacts with the powdery material in a small area it causes heating of the irradiated area but also transfer of charges from the beam particles into the exposed area. The charges are transported out from the exposed area partly through the surrounding powdery material at a rate determined by the electrical conductivity of the powdery material and partly through secondary electron emission from the exposed area. Depending on the intensity of the charged particle beam, the electrical conductivity of the powdery material and the efficiency of secondary electron emission, the powdery material may, in some regions, reach an amount of charging high enough for the electrostatic force between the charged particles at the surface and underlying charged particles to overcome the force of gravity. Thus at this point charged powder particles will lift from and leave the working area and move around above the powder bed. This phenomenon propagates to surrounding areas of the powder layer resulting in a massive powder discharge or lift-off where large amounts of powder will whirl around above the powder bed and perhaps around the entire irradiation chamber. A result of a massive powder lift-off is that the powder particles that have left the working area interfere with the beam and that the structure of the powder layer is destroyed, When this happens, the production process must be interrupted in order to remove the spread-out powder and apply a new layer of powder onto the working table. These procedures take some time to complete and, in the interest of process stability and production rate, it is important to avoid such powder discharges.

Applying the method according to US 2005/0186538 to a powder melting/sintering device equipped with an electron beam is likely to give a poor result since no measures are taken in that method to avoid powder lift-off.

One solution to the problem of avoiding discharges is to add conductive material, such as carbon, to the powder as to increase the electrical conductivity of the powder. Disadvantages of this solution are, however, that the solidifying process of such a powder mixture may be difficult to control and that the properties of the formed product may he affected in a negative way. For instance, the mechanical strength may be decreased.

To lower the probability for powder lifting to occur it may be possible to increase the conductivity in the surrounding powder by performing a more thorough heating or sintering. However, such a procedure increases the time of building a three-dimensional body and because production time is an important parameter this approach is not fully satisfying, There is thus still a need for improvements in the field of handling lift-off of powder from the work table.

BRIEF SUMMARY

The object of this invention is to provide a method and apparatus for producing three-dimensional objects using powder layers and a charged particle beam, which method and apparatus exhibit improved properties compared to conventional methods and apparatuses with regard to handling of powder lifting from the work table. This object is achieved by the method and apparatus defined by the technical features contained in the independent claims. The dependent claims contain advantageous embodiments, further developments and variants of the invention.

The invention concerns a method for producing three-dimensional objects layer by layer using a powdery material which can be solidified by irradiating it with a beam of charged particles, which method comprises the following steps: successive application of powder layers to a working area, and fusing together successive layers of said three-dimensional object by successively irradiating the powdery layers with said beam. The inventive method is characterized in that it comprises the following steps: i) determining whether lifting of powdery material from the working area occurs using a powder-lifting detection device capable of generating a detection signal upon detection of lifting of powdery material from the working area, and ii) interrupting the irradiation of at least a part of the working area where powder lifting occurs using the detection signal generated by the powder-lifting detection device for automatically triggering the interruption.

Such a method has the advantageous effect of making it possible to automatically suppress the unwanted powder lifting effect at an early stage before it has led to harmful contamination or charge transfer into surrounding areas of the powder layer, which harmful contamination or charge transfer often leads to a major powder lift-off, complete discontinuation of the building of the three-dimensional part and the necessity to restart the building sequence from the start. An early suppression of the lifting effect makes it possible to restart the building of the three-dimensional object after the lifting effect has settled leading to a significant saving of building material and time for the completion of the three-dimensional object.

Since the inventive method makes the powder lifting phenomenon less harmful, a further advantage is that less time and effort needs to be spent on developing methods and material etc. for avoiding powder lift-off The inventive method can of course also be used in connection with various actions for avoiding powder lifting. In such a situation the inventive method works more as a safety system that is activated when the normal systems fail. The risk of powder lifting to occur is probably always present even if various precautions are taken.

In an advantageous embodiment of the invention the step of interrupting the irradiation of at least a part of the working area where powder lifting occurs is performed within a first time-period starting at a point of time when the detection signal is created, wherein the first time-period is less than 5 seconds. Preferably, the first time-period is less than 500 ms, more preferably less than 50 ms. Because it normally is an advantage to suppress the powder-lifting effect as quickly as possibly, it is normally an advantage if this first time-period is as short as possible. Suitable time-periods depend e.g. on sensitivity of detection device, type of powder, beam power etc. In some applications a few seconds may be sufficient. In other applications time-periods of one or two orders of magnitude lower than that should be used.

In an advantageous embodiment of the invention the step of interrupting the irradiation of at least a part of the working area where powder lifting occurs is performed by turning off the beam. This is a safe way of interrupting the powder lifting process.

In an advantageous embodiment of the invention the step of interrupting the irradiation of at least a part of the working area where powder lifting occurs is performed by guiding the beam into another direction. The beam can be guided outside the working area or towards other parts of the working area. In certain applications it is an advantage to avoid turning off and on the beam. It may also be useful to continue irradiating other parts of the working area, e.g. for heating purposes. If the beam is guided such as to irradiate other parts of the working area, the beam is preferably operated with a reduced average beam power for avoiding powder lifting but still keeping up the temperature of the powder such as to keep up the production speed. Reduced average beam power can be achieved with a pulsed beam or by reducing the beam power.

In an advantageous embodiment of the invention the method further comprises the step of re-starting the irradiation of the part of the working area where powder lifting has occurred. Preferably, the re-starting of the irradiation is carried out automatically after a certain, second time-period from the step of interrupting the irradiation. If the powder-lifting effect has been quickly interrupted it is likely that a new powder layer is not required and that the irradiation simply can be continued. This second time-period is in such a case preferably in the order of a few seconds. The second-time period may be set to be a function of the first time period.

In an advantageous embodiment of the invention the method further comprises the step of modifying certain operation parameters, such as heating parameters, before re-starting the irradiation. This way further powder lifting events can be avoided.

The invention also concerns an apparatus for producing three-dimensional objects layer by layer using a powdery material which can be solidified by irradiating it with a beam of charged particles, said apparatus comprising means for successive application of powder layers to a work table, and a radiation gun for delivering said beam of charged particles. The inventive apparatus further comprises a powder-lifting detection device capable of generating a signal upon detection of lifting of powdery material from the working area. Such an apparatus makes it possible to rapidly and automatically detect powder-lifting events. Preferably, the apparatus is arranged to use the detection signal created by the powder-lifting detection device for automatically trigging interruption of the irradiation of at least a part of the working area where powder lifting occurs. Such an apparatus is suitable for being operated by the inventive method.

In an advantageous embodiment of the inventive apparatus the powder-lifting detection device comprises a detection unit that is capable of generating a primary signal that varies with varying amounts of powder particles present above or beside the working area. Thereby, the powder-lifting effect can be quantified.

In an advantageous embodiment of the inventive apparatus the powder-lifting detection device comprises a capacitor having two plates over which a voltage is applied, wherein the plate facing the working area is movable. Such a microphone type detection device has various advantages compared to other types of detectors. For instance, it is not affected by the electron beam and it is less costly.

In a preferred variant of this embodiment the apparatus is provided with a second powder-lifting detection device of the same type, wherein the second powder-lifting detection device is arranged to be insensitive to powder-lifting events, and wherein a difference signal from the two powder-lifting detection devices is used for generating the detection signal. This way true powder-lifting events can be distinguished from "false alarms" in the form of interferences, such as noise from the apparatus 1 and external knocks onto the chamber 2, which may create a detection signal if only one microphone detector is used.

BRIEF DESCRIPTION OF THE SEVERAL VIEWS OF THE DRAWING(S)

Figure 2:
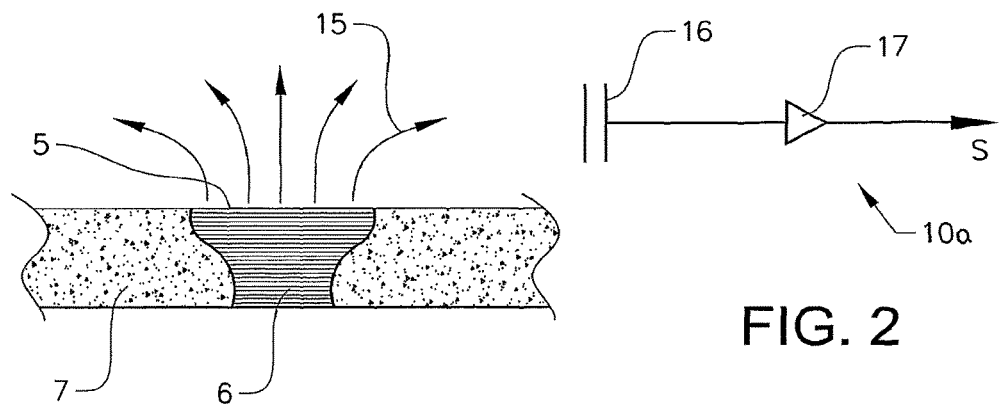
Figure 3:
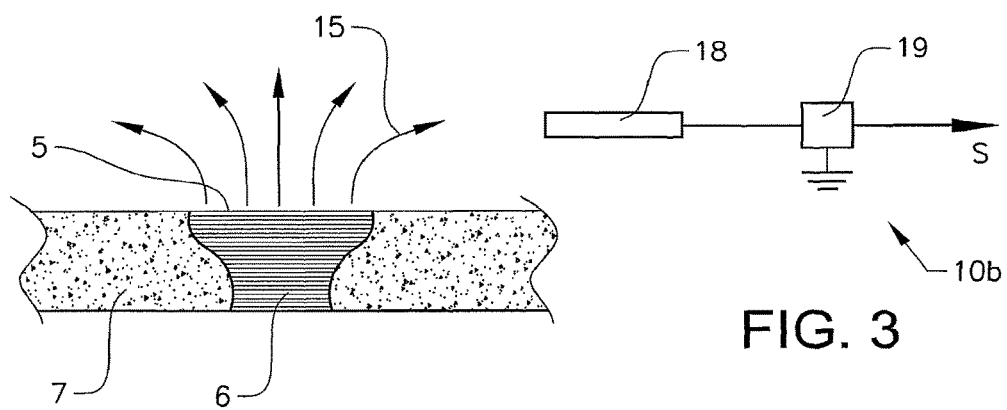
Figure 4:
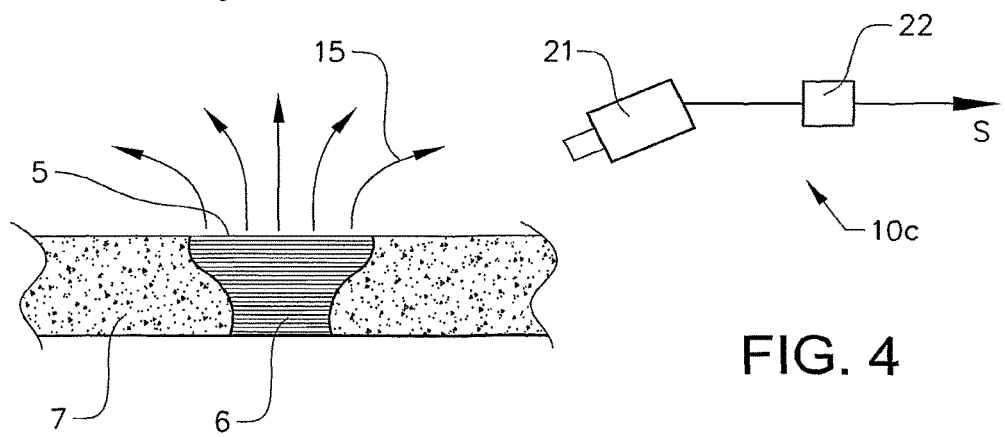
Figure 5:
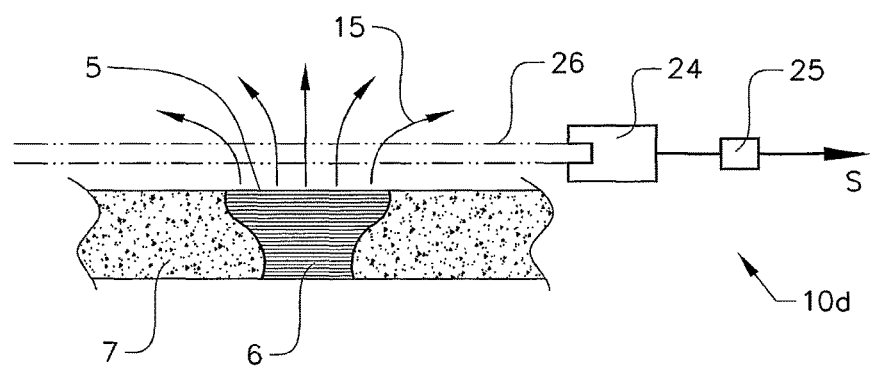
Figure 6:
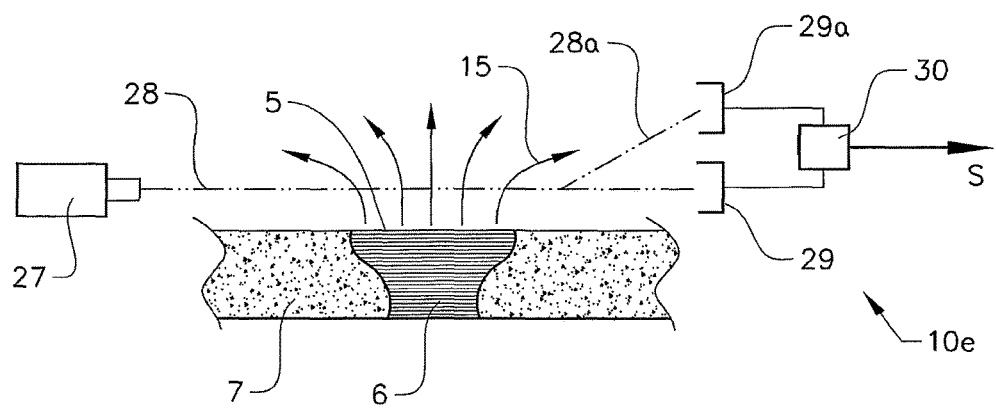

In the description of the invention given below reference is made to the following figures, in which:

FIG. 1 shows, in a schematic view, a preferred embodiment of an apparatus according to the invention, FIG. 2 shows, in a schematic view, a first example of a powder-lifting detection device for use with the apparatus shown in FIG. 1, FIG. 3 shows, in a schematic view, a second example of a powder-lifting detection device for use with the apparatus shown in FIG. 1, FIG. 4 shows, in a schematic view, a third example of a powder-lifting detection device for use with the apparatus shown in FIG. 1, FIG. 5 shows, in a schematic view, a fourth example of a powder-lifting detection device for use with the apparatus shown in FIG. 1, and FIG. 6 shows, in a schematic view, a fifth example of a powder-lifting detection device for use with the apparatus shown in FIG. 1.

DETAILED DESCRIPTION OF VARIOUS EMBODIMENTS

FIG. 1 shows, in a schematic view, a preferred embodiment of an inventive apparatus 1 for producing a three-dimensional object 6 layer by layer using a powdery material which can be solidified by irradiating it with an energy beam. The described apparatus 1 is suitable for applying the inventive method. The apparatus 1 comprises an electron gun 3 generating an electron beam 4 in an evacuated chamber 2. A powder bed 7 is positioned onto a height adjustable work table 9. Powder is taken from a powder supply (not shown) and applied layer by layer onto the working table 9. An upper part of the powder bed 7 forms a working area 5 over which the electron beam 4 sweeps during irradiation. After irradiation and fusing together of selected parts of the working area 5, a new layer of powder is distributed over the working area 5 on top of the powder bed 7. These parts, as well as how to control the electron gun 3, how to establish vacuum in the chamber 2 etc., are well known to the skilled man in the art.

in contrast to a conventional apparatus, the inventive apparatus 1 further comprises a powder-lifting detection device 10 for detection of lifting of powdery material from the working area 5, i.e. for detection of powdery material that has left the working area 5 and that is present above and/or aside of the working area 5. The detection device 10 is positioned inside the chamber 2 at a side of the working area 5 and is electronically connected to a control unit 11 that in turn is electronically connected to the electron gun 3 for controlling purposes, such as for directing the beam 4 and for turning on and off the beam 4. The electronic connections are indicated with dashed lines 13. The powder-lifting detection device 10 is arranged in such a way that it is capable of generating an electronic signal S upon detection of lifting of powdery material from the working area 5.

As described above, during irradiation of the working area 5 part of the powdery material may reach an amount of charging high enough for making powder particles begin to lift from and leave the working area 5 and move around above and beside of the powder bed 7. The powder-lifting detection device 10 detects such an event and generates an electronic detection signal S. This signal is sent to the control unit 11 which controls the electron gun 3 in such a way that the irradiation of the working area 5, or at least of a part of working area 5 where powder lifting occurs, is interrupted. Thus the electronic signal S created by the powder-lifting detection device 10 is used for automatically trigging the interruption. This way it is possible to prevent the lifting phenomenon from propagating to surrounding parts of the working area 5 and thereby it is possible to prevent a massive powder lift-off. If the powder-lifting process is interrupted sufficiently quickly it is possible to continue the production process without having to apply a new layer of powder.

Interruption of the irradiation of a part of the working area 5 can be carried out by turning off the beam 4 or by directing the beam 4 towards another part of the working area 5 or towards an area outside of the working area 5. If the beam 4 is directed towards another part of the working area 5, the average power of the beam 4 is preferably reduced for some time in order to avoid a new powder-lifting event but at the same time keep up the heat of the powder. A reduced average beam power can be achieved by reducing the beam power and/or by pulsing the beam.

Irradiation of the part of the working area 5 subject to powder-lifting is continued automatically after a certain, second time period which in this example is 5 seconds.

The powder-lifting detection device 10 is arranged to detect a powder-lifting event at an early stage so that it can be suppressed at an early stage and so that the irradiation can be continued after the relatively short second time period.

As a safety measure, the powder-lifting detection device 10 is also arranged to quantify the powder-lifting event, i.e. to quantify the amounts of powder that has lifted from the working area 5. Thus the powder-lifting detection device 10 is for instance capable of determining whether a major powder discharge has occurred. If the powder discharge is determined to exceed a certain level, a second electronic signal S2 is generated for cancelling or delaying the automatic re-start of the irradiation. In such a case it may be necessary to apply a new layer of powder onto the working area 5.

FIGS. 2-6 show, in schematic views, examples of powder-lifting detection devices 10 *a*-10 *e* for use with the apparatus shown in FIG. These figures show parts of the powder bed 7 and the three-dimensional object 6 as well as the working area 5. Powder particles that have lifted from the working area 5 and that move around above and away from the working area 5 are indicated with arrows 15.

In FIG. 2 the powder-lifting detection device 10 *a* is a type of capacitive microphone detector positioned at a side of the powder bed 7. This detection device 10 *a* comprises a capacitor 16 having two plates over which a voltage is applied. The capacitor plate facing the working area 5, i.e. left plate in FIG. 2, is movable (i.e. flexible, deformable, etc.) whereas the other plate is stationary. Powder particles that lift from the working area 5 and hit the movable capacitor plate induce movements (deformations, vibrations, etc.) of the plate which influences the distance between the two plates and thus the capacitance of the capacitor 16. This change of capacitance can be converted to an electronic signal. An amplifier 17 is provided for amplifying the primary signal Obtained from the capacitor 16 such as to generate the signal S used for interrupting the irradiation process as described above. Capacitor microphones are known as such and can he designed in different ways.

In FIG. 3 the powder-lifting detection device 10 *b* is a type of Faraday cup detector positioned at a side of the powder bed 7. This detection device 10 *b* comprises a conductive cup 18 and an electronic device 19 for measuring a current and for producing the electronic signal S. Powder particles that lift from the working area 5 and hit the cup 18 carry a charge acquired from the beam 4. These charges are collected by the cup 18 and the resulting current is measured by the device 19. If the current exceeds a certain value the signal S is generated. Faraday cups are known as such and can he designed in different ways.

In FIG. 4 the powder-lifting detection device 10 *c* comprises a camera 21 directed at an angle downwards towards the working area 5. The detection device 10 *c* further comprises an image processing unit 22 capable of analyzing a signal from the camera 21 such as to identify whether powder-lifting occurs as well as of generating the electronic signal S if that is the case. Cameras and image processors are known as such and can be designed in different ways.

In FIG. 5 the powder-lifting detection device 10 *d* comprises an X-ray detector 24 with a field of view 26 directed above and across the working area 5. Powder particles exposed to the beam 4 emit X-rays. If powder lifting occurs, X-ray emitting particles will be present in the field of view 26 of the X-ray detector 24 and will thus be detected by the X-ray detector 24. The detection device 10 *d* further comprises a signal processing unit 25 capable of analyzing a signal from the X-ray detector 24 such as to identify whether powder-lifting occurs as well as of generating the electronic signal S if that is the case. X-ray detectors and signal processors are known as such and can be designed in different ways.

In FIG. 6 the powder-lifting detection device 10 *e* comprises a laser source 27 capable of generating a laser beam 28 directed above and across the working area 5. If powder lifting occurs powder particles will be present in the path of the laser beam 28 resulting in scattering of the light in the laser beam 28. To detect powder lifting it is therefore possible to either detect a decrease in intensity of the original laser beam 28 or to detect an increase of scattered laser light 28 a. A first light detector 29 is arranged to detect the intensity of the original laser beam 28 and a second light detector 29 a is arranged to detect scattered laser light 28 a. The detection device 10 e further comprises a signal processing unit 30 capable of analyzing a signal from the light detectors 29, 29 a such as to identify whether powder-lifting occurs as well as of generating the electronic signal S if that is the case. The powder-lifting detection device 10 e may comprise either or both light detectors 29,29 a. Laser sources, light detectors and signal processors are known as such and can be designed in different ways.

All powder-lifting detection devices 10 a-10 e can be adapted to determine the amount of powder particles registered by the detector and not just to determine whether powder-lifting occurs, which means that the powder-lifting effect can be quantified. Thereby the powder-lifting detection devices 10 a-10 e become capable of generating the second electronic signal S2 mentioned above.

The response time of the detector 10, i.e. the time from detecting occurrence of lifting of powdery material until sending the signal S used for trigging interruption of the irradiation, is preferably as short as possible. The sensitivity and the positioning of the detector should be adjusted to the particular application.

All powder-lifting detection devices 10 a-10 e shown in FIGS. 2-6 comprises a detection unit, i.e. the capacitor 16, the cup 18, the camera 21, the X-ray detector 24 and the first and second light detectors 29, 29 a, that is capable of generating a primary electronic signal that varies with varying amounts of powder particles present above or beside the working area 5.

The microphone detection device 10 a shown in FIG. 2 is particularly advantageous because i) it is not affected by the electron beam (as a Faraday cup might be), ii) the signal strength is not dependent on the beam current (as is the case for the X-ray detector), and iii) it is simpler and less costly to implement compared to optical devices such as camera and laser which require considerations with regard to surface metallisation.

In a preferred variant of the invention the apparatus 1 is provided with a first and a second microphone detection device 10 a of the type shown in FIG. 2. One of these, the first microphone detection device 10 a, is arranged to detect powder-lifting as described above. The other, i.e. the second microphone detection device 10 a, is arranged in or at the apparatus 1 in a similar way as the first one but is arranged to be insensitive to powder-lifting events. This can, for instance, be achieved by providing a shield between the working area 5 and the second detector or by positioning the capacitor 16 of the second detector such that the stationary plate faces the working area 5. The first and second microphone detection devices are further arranged in such a way that the individual signal generated from one of the detectors is subtracted from the individual signal generated by the other detector, wherein the resulting difference signal is analyzed such as to identify whether powder-lifting occurs as well as to generate the signal S if that is the case. This way true powder-lifting events can be distinguished from "false alarms" in the form of interferences, such as noise from the apparatus 1 and external knocks onto the chamber 2, which may create a detection signal S if only one microphone detector is used.

The invention is not limited by the embodiments described above but can be modified in various ways within the scope of the claims. For instance, the detection device 10 can be positioned in other places inside or outside the chamber or integrated in a wall of the chamber 2. In some applications it may be advantageous to use more than one detection device. Also other types of detection devices may be useful in order to apply the inventive method.

Although the various signals and connections described above are electronic it is of course possible also to use other types of means for communication, such as optical or other types of electromagnetic signals and connections.

What is claimed is:

1. An apparatus for producing three-dimensional objects layer by layer using a powdery material which can be solidified by irradiating the powdery material with a beam of charged particles, said apparatus comprising:
    a powder supply portion configured for successive application of one or more layers of a powdery material to a work table to define a powder bed;
    a radiation gun configured for delivering said beam of charged particles and successively irradiating at least a part of the working area where the powdery material are applied, so as to fuse together successive layers of said three-dimensional object; and
    at least one detection device having a field of view focused above and across the work table on a volume spaced apart from the defined powder bed, such that neither the field of view nor the focused volume intersect any portion of the powder bed,
    wherein the at least one detection device is configured for:
        generating a powder-lifting detection signal upon detection of at least a portion of said powdery material having lifted from the working area and moving around above and spaced apart from the defined powder bed; and
        based upon the generated detection signal, automatically interrupting the irradiation of at least a part of the working area where the powdery material lifting has occurred.

2. The apparatus according to claim 1, wherein the detection signal created by the at least one detection device is used for automatically triggering interruption of the irradiation of at least a part of the working area where powder lifting occurs.

3. The apparatus according to claim 1, wherein the at least one detection device comprises a powder-lifting detection unit that is configured for generating a primary signal that varies with varying amounts of powder particles being detected moving around above and spaced apart from the defined powder bed.

4. The apparatus according to claim 1, wherein the at least one detection device comprises a capacitor having two plates over which a voltage is applied.

5. The apparatus according to claim 1, wherein the at least one detection device comprises a conductive cup and an electronic component configured for measuring a current and producing the detection signal.

6. The apparatus according to claim 1, wherein the at least one detection device comprises a camera directed at an angle relative to the working area.

7. The apparatus according to claim 6, wherein the at least one detection device further comprises an image processing unit configured for analyzing a signal from the camera so as to determine whether powder-lifting occurs, and based upon detection thereof, to generate the detection signal.

8. The apparatus according to claim 1, wherein the at least one detection device comprises an X-ray detector with a field of view directed above and across the working area.

9. The apparatus according to claim 1, wherein:
the at least one detection device comprises a laser source configured for generating a laser beam directed above and across the working area; and
said detection of said powder lifting is based upon at least one of a detection of a decrease in an intensity of the laser beam or an increase in a scattering of the laser beam.

10. The apparatus according to claim 1, wherein:
the at least one detection device comprises a first detection device that is sensitive to powder-lifting events and configured for generating the powder-lifting detection signal;
the apparatus further comprises a second detection device, the second detection device being insensitive to powder-lifting events; and
wherein a difference signal from the first and second detection devices is used for generating the detection signal.

11. The apparatus according to claim 10, wherein the second detection device comprises a capacitor having two plates over which a voltage is applied.

12. An apparatus for producing three-dimensional objects layer by layer using a powdery material which can be solidified by irradiating the powdery material with a beam of charged particles, said apparatus comprising:
a powder supply portion configured for successive application of powder layers to a work table to define a powder bed;
a radiation gun for delivering said beam of charged particles; and
at least one detection device having a field of view focused above and across the work table on a volume spaced apart from the defined powder bed, such that neither the field of view nor the focused volume intersect any portion of the powder bed,
wherein the at least one detection device is configured for generating a detection signal upon detection of at least a portion of powdery material having lifted from the working area and moving around above and spaced apart from the defined powder bed.

13. The apparatus according to claim 12, wherein the detection signal created by the detection device is used for automatically triggering interruption of the irradiation of at least a part of the working area where powder lifting occurs.

14. The apparatus according to claim 12, wherein the detection device comprises a detection unit that is configured for generating a primary signal that varies with varying amounts of powder particles present at least one of above or beside the working area.

15. The apparatus according to claim 12, wherein the detection device comprises a capacitor having two plates over which a voltage is applied.

16. The apparatus according to claim 12, wherein:
the at least one detection device comprises a first detection device that is sensitive to powder-lifting events and configured for generating the powder-lifting detection signal;
the apparatus further comprises a second detection device, the second detection device being insensitive to powder-lifting events; and
wherein a difference signal from the two detection devices is used for generating the detection signal.

17. The apparatus according to claim 16, wherein the second detection device comprises a capacitor having two plates over which a voltage is applied.

18. The apparatus according to claim 1, wherein the at least one detection device is positioned such that the field of view is focused along a plane parallel to the defined powder bed.

19. The apparatus according to claim 2, wherein the at least one detection device is positioned such that the field of view is focused along a plane parallel to the defined powder bed.

* * * * *